(No Model.)
R. H. RICE.
DEVICE FOR INFLATING PNEUMATIC TIRES.
No. 523,443. Patented July 24, 1894.
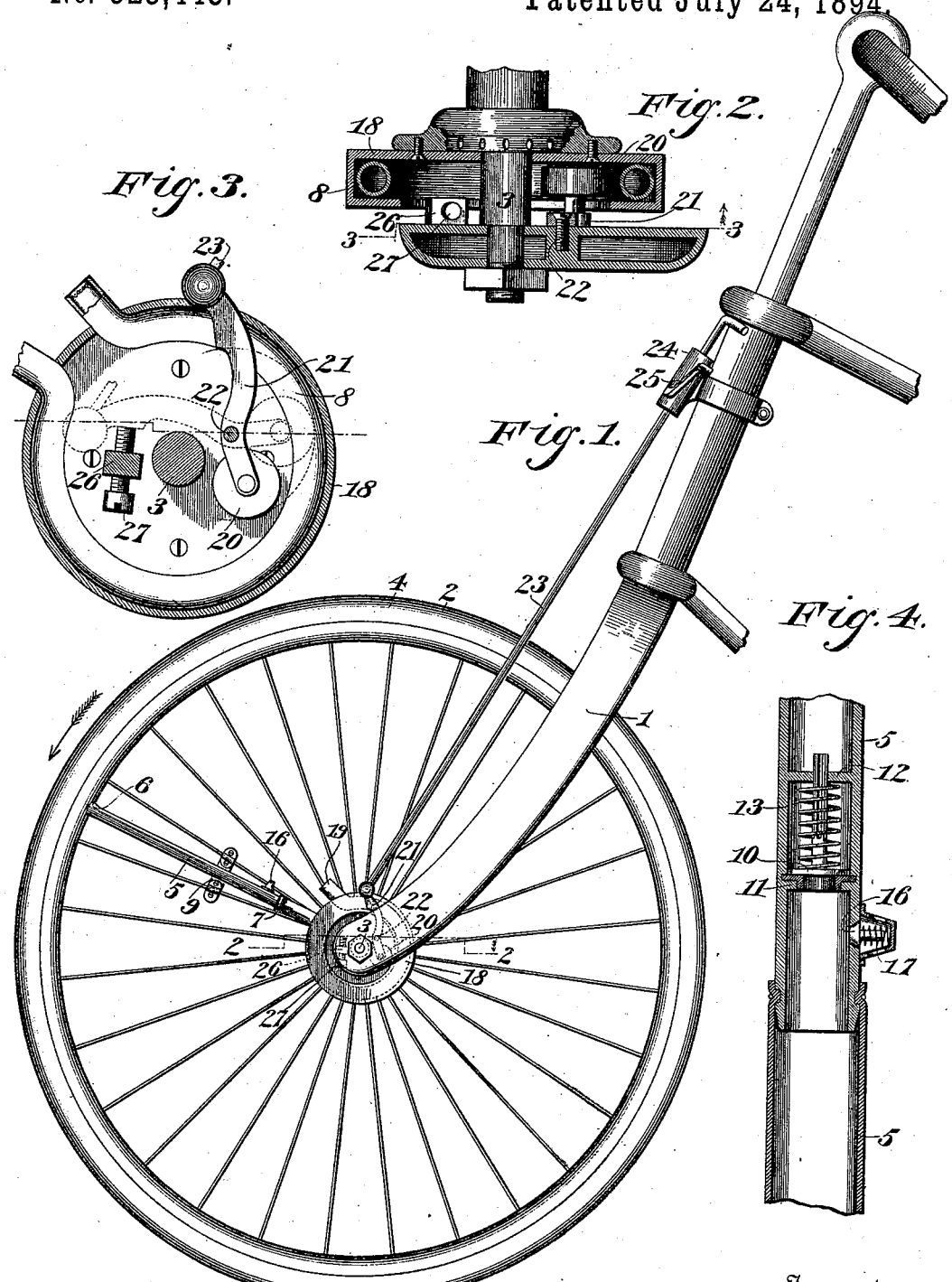
Witnesses:
J. M. Witherow
G. F. Myers
Inventor,
Robert H. Rice,
By Joseph L. Atkins
Attorney

UNITED STATES PATENT OFFICE.

ROBERT H. RICE, OF FREMONT, OHIO.

DEVICE FOR INFLATING PNEUMATIC TIRES.

SPECIFICATION forming part of Letters Patent No. 523,443, dated July 24, 1894.

Application filed November 4, 1893. Serial No. 490,027. (No model.)

*To all whom it may concern:*

Be it known that I, ROBERT H. RICE, of Fremont, county of Sandusky, State of Ohio, have invented certain new and useful Improvements in Devices for Inflating Pneumatic Tires, of which the following is a specification, reference being had to the accompanying drawings.

The object of my invention is to produce an improved apparatus for inflating pneumatic tires which shall be simple, cheap and durable in construction, noiseless in operation and which may be operated by the motion of the wheel which carries the tire.
In the accompanying drawings: Figure 1 is a side elevation of a bicycle fork and front wheel equipped with my device. Fig. 2 is a detail view showing a cross section, on the line 2—2 of Fig. 1. Fig. 3 is a vertical section on the line 3—3 of Fig. 2. Fig. 4 is a section of a portion of the tubing showing the valves.

Referring to the figures on the drawings: 1 indicates a fork of a bicycle which is illustrated as an example of a form of vehicle to which my invention may be applied. 2 indicates the wheel thereof carried, as usual, upon an axle 3.

4 indicates a pneumatic tire which as at present known to the art consists of an endless rubber tube.

5 indicates an air supply duct communicating through secure and air tight joints 6 and 7 with the tire, and with a compression chamber 8, respectively. This duct is supported by any suitable means, as for example, by a brace piece 9 secured to the spokes of the wheel. It is preferably made of tubular metal and may, for the sake of elegance, constitute one of the spokes of the wheel, but that is merely a matter of taste and convenience. Within the duct is located an inwardly opening valve 10 carried between stop pieces 11 and 12, for example, and held normally in the closed position, as by a spring 13 coiled around the valve stem 15. These are matters of detail, however, which may be varied as required. The duct is preferably provided with a safety valve 16 which may be made of any suitable and ordinary construction, it being held in the closed position by a force proportionate to the amount of pressure required to be maintained in the tire. This force may be secured by means of a spring 17 of proper strength, pressing the valve into its seat, as illustrated. The compression chamber consists of a flexible tube securely confined within the three walls of a compressor frame 18, as is clearly illustrated in detail in Fig. 2 of the drawings. The compression chamber is, on one side of the compressor frame, exposed to the operation of a compressing member. This compressing member is preferaby carried so as to operate within the compressor frame, and, squeezing the collapsible walls of the compression chamber together, prevents the escape of air at the open end 19. By the movement of the frame the air is driven into the duct 5. The compressing member preferably consists of a trolley or roller 20 carried upon a swinging frame 21 that is pivoted to one side of the fork 1, as indicated at 22. The frame extends beyond the pivotal point so as to afford a suitable leverage upon the end opposite that which carries the trolley. It is preferably pivoted to an actuating bar 23, which is carried at its upper end in a suitable box 24 so as to be within convenient reach of the rider or operator of the machine. By depressing the actuating bar, the trolley is forced securely against the compression chamber and sets the mechanism in the operating position.

A suitable lock 25 for holding the actuating bar in the operative position is provided within the box 24.

In order to prevent undue pressure of the trolley upon the walls of the compression chamber, I provide a lug 26 on the end of the fork in the path of the frame 18. Within this lug an abutment screw 27 is provided, by the movement of which the degree of rotation of the frame upon its pivot, and consequently the compressing power of the trolley, may be regulated.

What I claim is—

1. The combination with a frame, revoluble wheel and pneumatic tire, of a flexible compression chamber communicating with the tire, and a compressing member adapted to compress the compression chamber, substantially as and for the purpose specified.

2. The combination with a frame, revoluble wheel and pneumatic tire, of a flexible compression chamber communicating with the tire, a compressing member in operative relation with the flexible compression chamber and adapted to be operated to compress said chamber by the revolution of the wheel, substantially as specified.

3. The combination with a frame, revoluble wheel and pneumatic tire, of a flexible compression chamber communicating with the tire, a movable compressing member adapted to be moved into or out of operative relation with the compression chamber and means for operating said compressing member, substantially as specified.

4. The combination with a frame, revoluble wheel and pneumatic tire, of a flexible compression chamber, a compressor frame, and a compressing member adapted to compress the compression chamber, substantially as specified.

5. The combination with a frame, revoluble wheel and pneumatic tire, of a flexible compression chamber communicating with the tire, a compressor frame partially surrounding the compression chamber, a movable trolley frame and trolley, means for operating the trolley frame and means for limiting its movement, substantially as specified.

In testimony of all which I have hereunto subscribed my name.

ROBERT H. RICE.

Witnesses:
JOSEPH L. ATKINS,
FRANK E. WARD.